United States Patent
Tamura et al.

(10) Patent No.: US 9,260,250 B2
(45) Date of Patent: Feb. 16, 2016

(54) GEAR MOTOR HAVING AN ANTIROTATION MEMBER

(71) Applicant: SUMITOMO HEAVY INDUSTRIES, LTD., Tokyo (JP)

(72) Inventors: Mitsuhiro Tamura, Obu (JP); Hiroki Awashima, Obu (JP); Hidetaka Yamashita, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 1 day.

(21) Appl. No.: 14/057,420

(22) Filed: Oct. 18, 2013

(65) Prior Publication Data

US 2014/0183997 A1 Jul. 3, 2014

(30) Foreign Application Priority Data

Dec. 27, 2012 (JP) ................. 2012-285149

(51) Int. Cl.
| | |
|---|---|
| *B65G 23/08* | (2006.01) |
| *B65G 23/22* | (2006.01) |
| *H02K 7/116* | (2006.01) |
| *F16H 57/025* | (2012.01) |
| *H02K 5/24* | (2006.01) |
| *B65G 23/00* | (2006.01) |

(52) U.S. Cl.
CPC ............... *B65G 23/08* (2013.01); *B65G 23/22* (2013.01); *F16H 57/025* (2013.01); *H02K 5/24* (2013.01); *H02K 7/116* (2013.01); *B65G 23/00* (2013.01)

(58) Field of Classification Search
CPC ...... H02K 7/003; H02K 7/116; F16H 57/025; B65G 23/08; B65G 23/22

USPC ........... 310/75 D, 423, 431, 83; 198/788, 832
See application file for complete search history.

(56) References Cited

U.S. PATENT DOCUMENTS

| | | | | |
|---|---|---|---|---|
| 2,984,336 | A | * | 5/1961 | Frost, Jr. .................. 198/536 |
| 3,456,605 | A | * | 7/1969 | Kremer .................... 110/327 |
| 3,980,170 | A | * | 9/1976 | Jakes et al. ............... 198/782 |
| 4,723,455 | A | * | 2/1988 | Maloney ................... 74/89.37 |
| 5,014,800 | A | * | 5/1991 | Kawamoto et al. ........ 180/65.51 |
| 5,115,908 | A | * | 5/1992 | Williams .................. 198/832 |
| 5,131,527 | A | * | 7/1992 | Huber ..................... 198/782 |
| 5,149,049 | A | * | 9/1992 | Nemura et al. ............ 248/674 |
| 7,007,795 | B2 | * | 3/2006 | Zoller et al. .............. 198/803.2 |

(Continued)

FOREIGN PATENT DOCUMENTS

| | | | |
|---|---|---|---|
| CN | 101628486 B | * | 2/2012 |
| DE | 1 091 829 | | 10/1960 |

(Continued)

OTHER PUBLICATIONS

European Search Report application No. 13020116.3 dated May 8, 2014.

*Primary Examiner* — Burton Mullins
(74) *Attorney, Agent, or Firm* — Squire Patton Boggs (US) LLP

(57) ABSTRACT

A gear motor is provided with a motor, a decelerator, an output shaft of the decelerator coupled to a driven shaft of a driven machine, and a torque arm for preventing rotation of the gear motor around the driven shaft. One end of the torque arm is fixed to the gear motor and the other end is fixed to an installation seat. The torque arm is provided with a damper mechanism.

5 Claims, 4 Drawing Sheets

(56) References Cited

U.S. PATENT DOCUMENTS

| | | | |
|---|---|---|---|
| 8,007,389 B2* | 8/2011 | Yudate et al. | 475/149 |
| 8,229,325 B2* | 7/2012 | Iwata et al. | 399/167 |
| 8,689,948 B2* | 4/2014 | Winkler | 188/78 |
| 2005/0269979 A1* | 12/2005 | Min et al. | 318/66 |
| 2006/0237602 A1* | 10/2006 | Whitley et al. | 248/205.1 |
| 2007/0200962 A1* | 8/2007 | Choi et al. | 348/794 |
| 2011/0204204 A1 | 8/2011 | Hertel et al. | |
| 2011/0309192 A1* | 12/2011 | Luce | 244/100 R |
| 2012/0169176 A1* | 7/2012 | Toledo et al. | 310/240 |

FOREIGN PATENT DOCUMENTS

| | | | | |
|---|---|---|---|---|
| DE | 3504751 | * | 8/1986 | B65G 1/127 |
| DE | 43 27 533 C1 | | 1/1995 | |
| DE | 10 2008 030 192 A1 | | 12/2009 | |
| EP | 2315860 A2 | | 5/2011 | |
| JP | 08/282822 A | | 10/1996 | |
| JP | 2003-299295 A | | 10/2003 | |
| JP | 2006-130986 A | | 5/2006 | |

* cited by examiner

GEAR MOTOR HAVING AN ANTIROTATION MEMBER

BACKGROUND OF THE INVENTION

1. Field of the Invention

The present invention relates to a gear motor comprising a motor and a decelerator.

2. Description of the Related Art

Gear motors are used in an extensive range of applications. For example, gear motors are used in underbody of large-scale movable equipment such as cranes, in a system to drive rollers of a belt conveyor, etc. A gear motor usually comprises a power engine and a decelerator, and is used by coupling an output shaft of the decelerator to a driven shaft of a driven machine.

Normally, the driven machine is relatively heavy so that it is necessary to provide means to supply rotation reaction to the gear motor in order to prevent the gear motor itself from being rotated when used to drive the machine. The applicant proposes a technology capable of supplying rotation reaction to the gear motor by means of a torque arm.

SUMMARY OF THE INVENTION

One embodiment of the present invention relates to a gear motor. The gear motor comprises a motor, a decelerator, an output shaft of the decelerator coupled to a driven shaft of a driven machine, and a torque arm for preventing rotation of the gear motor around the driven shaft. One end of the torque arm is fixed to the gear motor and the other end of the torque arm is fixed to an external member. The torque arm is provided with a damper mechanism.

Another embodiment of the present invention also relates to a gear motor. The gear motor comprises a motor, a decelerator, an output shaft of the decelerator coupled to a driven shaft of a driven machine, and an antirotation member for preventing rotation of the gear motor around the driven shaft. The antirotation member is located at a position offset from the center of output shaft of the decelerator at which it is possible to prevent rotation of the gear motor, and the antirotation member includes an elastic member on a side facing the gear motor.

Optional combinations of the aforementioned constituting elements, and implementations of the invention in the form of apparatuses, methods, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
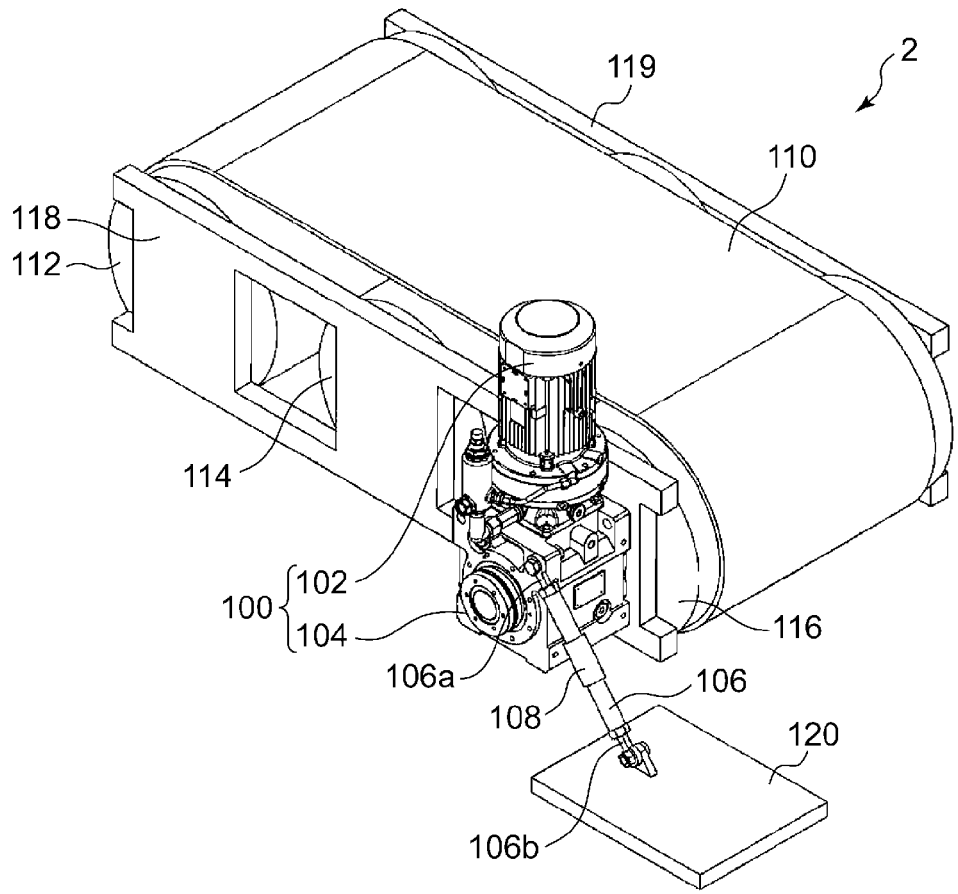
FIG. 1 is a perspective view of a belt conveyor system provided with a gear motor according to the first embodiment.

The invention will now be described by reference to the preferred embodiments. This does not intend to limit the scope of the present invention, but to exemplify the invention.

Like numerals in the drawings represent like constituting elements or members so that the description is not repeated. For ease of understanding, the dimension of the members in the drawings may be shown on an enlarged or reduced scale as appropriate. Some of the members not important for the purpose of describing the embodiments are not shown in the drawings.

When a gear motor is started or stopped, a relatively large shock load is generated due to the inertia of the decelerator gear or of the driven machine. In the conventional technology, a large shock load is directly exerted on the torque arm or the gear motor body so that the torque arm or the gear motor body could be adversely affected.

One embodiment of the present invention addresses a need to provide a gear motor capable of mitigating a shock load.

First Embodiment

In a gear motor according to the first embodiment, a damper mechanism is provided in a torque arm for supplying rotation reaction to the gear motor. This can achieve soft start of a gear motor in which a starting torque beyond the motor rating is generated, without electrical control. Since electrical control is not required, the gear motor can be manufactured at a reduced cost.

Figure 2:
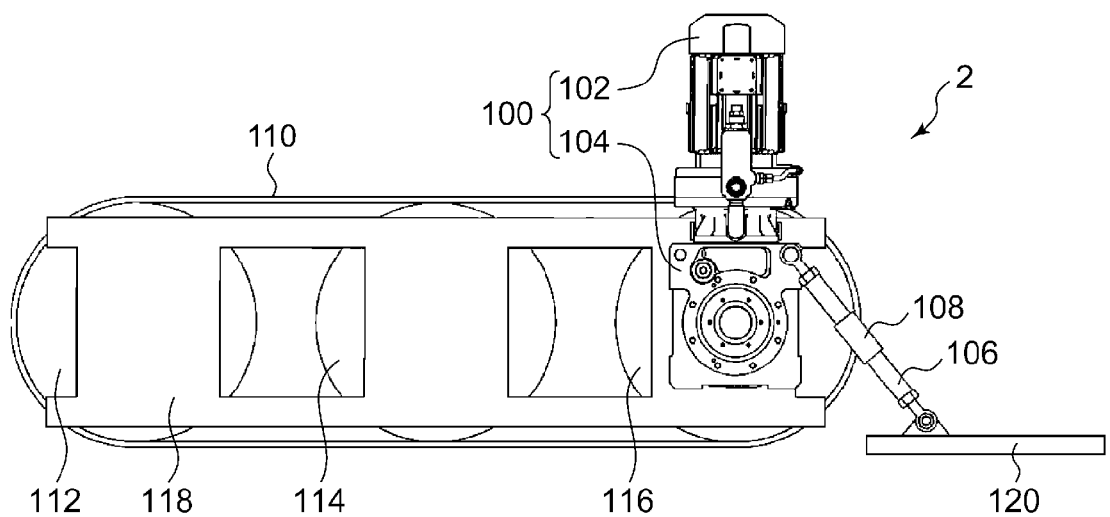
FIG. 2 is a lateral view of the belt conveyor system of FIG. 1.

FIG. 1 is a perspective view of a belt conveyor system 2 provided with a gear motor 100 according to the first embodiment. FIG. 2 is a lateral view of the belt conveyor system 2 The belt conveyor system 2 comprises a conveyor belt 110, a first driven roller 112, a second driven roller 114, a driving roller 116, a first frame 118, a second frame 119, and a torque arm 106.

The first driven roller 112, the second driven roller 114, and the driving roller 116 are arranged in the stated order so as to be substantially aligned in the horizontal direction. The conveyor belt 110 is wound around the three rollers. One end of the shaft of each of the first driven roller 112, the second driven roller 114, and the driving roller 116 (the shaft of the first and second driven rollers 112 and 114 is not shown) is rotatably coupled to the first frame 118 via a bearing (not shown). The other end of the shaft is rotatably coupled to the second frame 119 via a bearing (not shown). The first and second frames 118 and 119 are secured to the floor of a building such as factory in which the belt conveyor system 2 is installed. The floor of the building exemplifies an external member outside the system. Other examples of the external member include a pillar, a wall, or other equipment.

The shaft of the driving roller 116 (hereinafter, referred to as a driven shaft) runs through the first frame 118 and so includes a portion (hereinafter, referred to as an exposed portion) exposed on the side of the first frame 118 opposite to the side facing the driving roller 116.

The gear motor 100 is fitted to the exposed portion of the driven shaft so as to rotate the driving roller 116. The gear motor 100 includes a motor 102 and a decelerator 104. The motor 102 is an electric motor and is not controlled by an inverter (does not include an inverter). The motor 102 is either not operating or operating in response to a prescribed input voltage or a prescribed input power. The decelerator 104 is configured to provide perpendicular deceleration. The input shaft of the decelerator 104 is substantially perpendicular to the output shaft thereof.

The decelerator 104 is located between the motor 102 as a power engine and the driving roller 116 as a driven machine. The decelerator 104 transmits the rotation of the motor 102 to the driving roller 116. In this process, the decelerator 104 converts the rotation speed and torque provided by the motor 102 to the input shaft (not shown) of the decelerator 104 into the rotation speed and torque necessary for the driving roller 116. The decelerator 104 provides the resulting rotation speed and torque to the driven shaft via the output shaft of the decelerator 104.

The output shaft of the decelerator 104 is mechanically coupled to the driven shaft. Specifically, the output shaft is coupled to the driven shaft such that rotation of the output shaft relative to the driven shaft is restricted. Such coupling may be implemented by engagement between a key and a key seat.

A torque arm 106 prevents rotation of the gear motor 100 around the driven shaft. When the torque arm 106 is removed from the gear motor 100, the angular position of the gear motor 100 relative to the driven shaft becomes unstable. The torque arm 106 supports the gear motor 100 so that the angular position of the gear motor 100 relative to the driven shaft remains substantially unchanged. Specifically, the torque arm 106 provides rotation reaction to the gear motor 100. By way of one example, the orientation of the gear motor 100 is solely determined by the torque arm 106. The gear motor 100 is not directly and mechanically fixed to the external member except for the torque arm 106, the driven shaft, and the electrical wiring to the motor 102.

One end 106a of the torque arm 106 is bolted to the housing of the decelerator 104. The other end 106b of the torque arm 106 is bolted to an installation seat 120. The installation seat 120 is a plate fixed to the floor of a factory.

The torque arm 106 is provided with a damper mechanism 108 between the one end 106a and the other end 106b. The damper mechanism 108 is capable of exerting a damping force both in the direction in which the torque arm 106 extends and in the direction in which it retracts (the longitudinal direction of the torque arm 106). The damper mechanism 108 may be implemented by a hydraulic cylinder, an air cylinder, or a spring. Alternatively, the damper mechanism 108 may be implemented by using a damper technology used in known suspensions.

Figure 3:
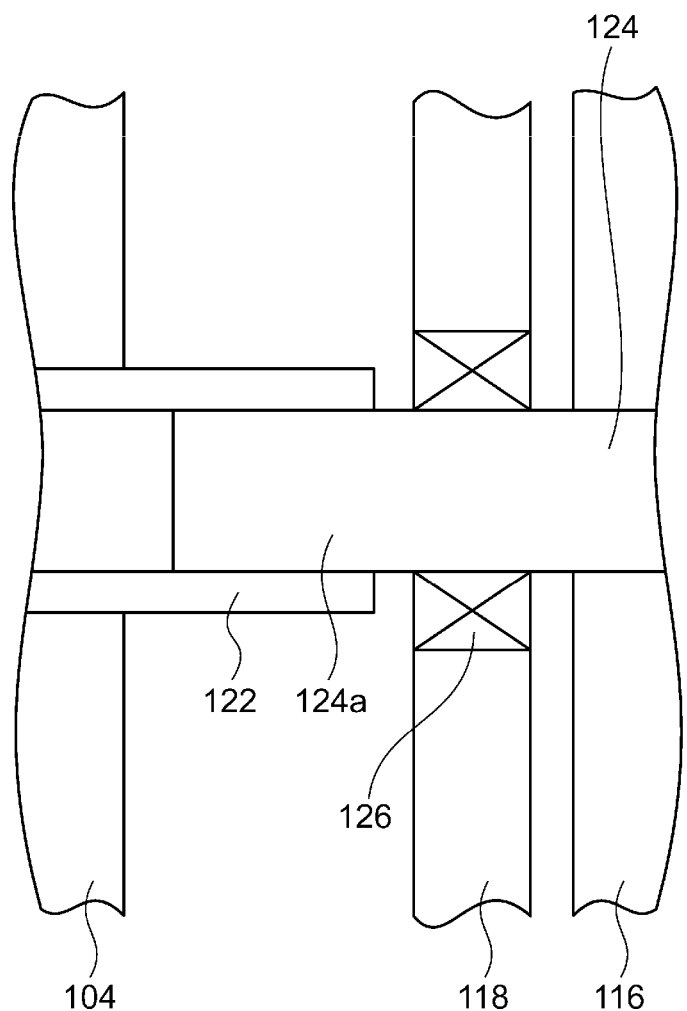
FIG. 3 shows a cross section of a part in which the output shaft of the decelerator and the driven shaft of the driving roller are coupled.

FIG. 3 shows a cross section of a part in which the output shaft 122 of the decelerator 104 and the driven shaft 124 of the driving roller 116 are coupled. The output shaft 122 is a hollow shaft. The exposed portion 124a of the driven shaft 124 is inserted into the output shaft 122. The driven shaft 124 is rotatably coupled to the first frame 118 via a bearing 126.

A description will now be given of the operation of the gear motor 100 described above. To start the belt conveyor system 2, the operator powers the motor 102 on. This applies a voltage of the same level as used in a normal operation to the motor 102 (full voltage starting or line starting). In this process, a shock load (or a starting torque) of a considerable amount is exerted on the gear motor 100 due to the inertia of the gear inside the decelerator 104 or of the driving roller 116. The shock load acts to rotate the gear motor 100 around the driven shaft 124. The torque arm 106 supports the gear motor 100 on the floor so as not to cause the gear motor 100 to be rotated due to the shock load. In this process, the damper mechanism 108 absorbs the shock load or causes the shock load to escape. More specifically, the gear motor 100 is permitted to be rotated slightly around the driven shaft 124 as a result of the damper mechanism 108 extending or retracting. This scatters the shock generated when the motor 102 is started. The damper mechanism 108 similarly absorbs the shock load when the belt conveyor system 2 is stopped.

According to the gear motor 100 of the embodiment, the shock load generated when the gear motor 100 is started or stopped is absorbed by the damper mechanism 108 and so is reduced. Therefore, adverse impact from the shock load on the gear motor 100 is reduced so that the life of the gear motor 100 is extended.

Instead of providing the damper mechanism 108, the shock load may be relieved by providing an inverter for adjusting the voltage or current supplied to the motor 102 when the motor is started or stopped. However, such an inverter is usually more expensive than the damper mechanism 108. Therefore, provision of the damper mechanism 108 according to the embodiment is more cost efficient.

Another disadvantage with an inverter is that it will be out of operation upon occurrence of sudden power failure. A large shock load generated upon occurrence of emergency shutdown is directly exerted on an inverter-controlled gear motor. In contrast, provision of the damper mechanism 108 according to the embodiment ensures the shock load generated upon occurrence of emergency shutdown is successfully absorbed because the damper mechanism 108 continues to be in operation regardless of whether power is fed or not.

The method according to the embodiment can easily be applied to existent gear motors. In other words, the capability to reduce a shock load can be introduced by replacing the existing torque arm supporting the gear motor with the torque arm 106 according to the embodiment. By additionally providing the torque arm 106 according to the embodiment in an existing inverter-controlled gear motor, the shock load generated when the motor is started or stopped can be further reduced and the shock load generated upon occurrence of emergency shutdown due to sudden power failure can be relieved.

Second Embodiment

Figure 4:
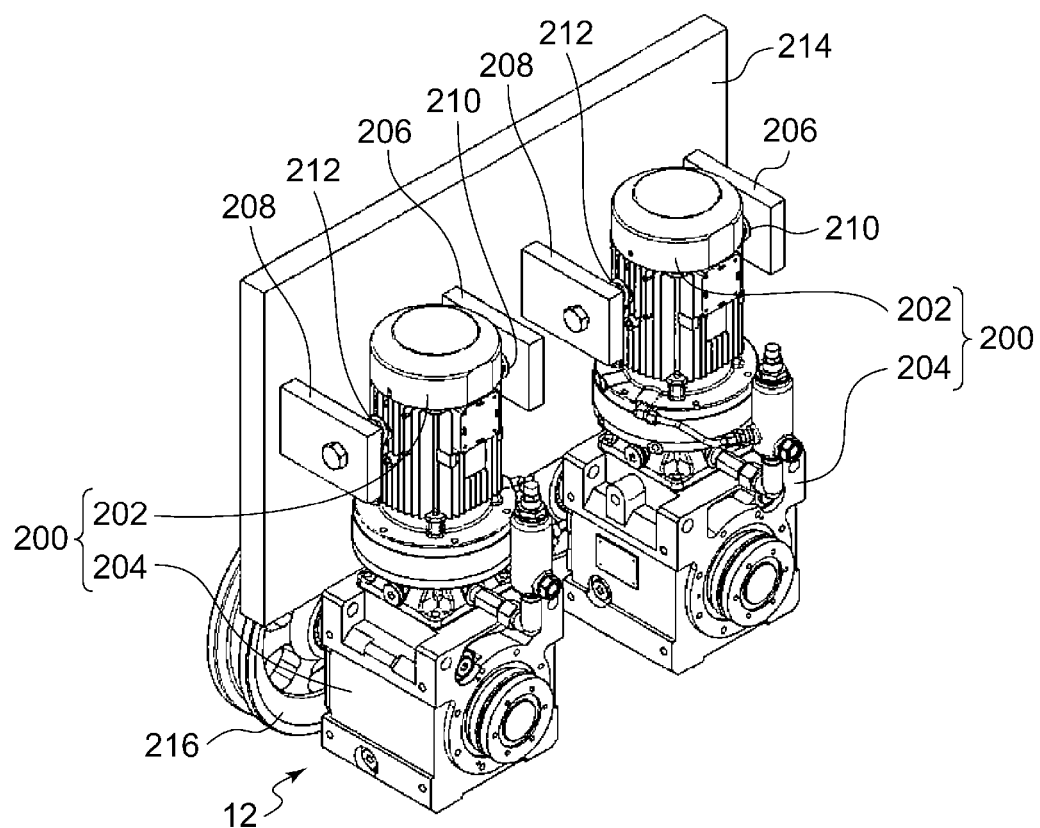
FIG. 4 is a perspective view of a traveling mechanism provided with the gear motor according to the second embodiment.
Figure 5:
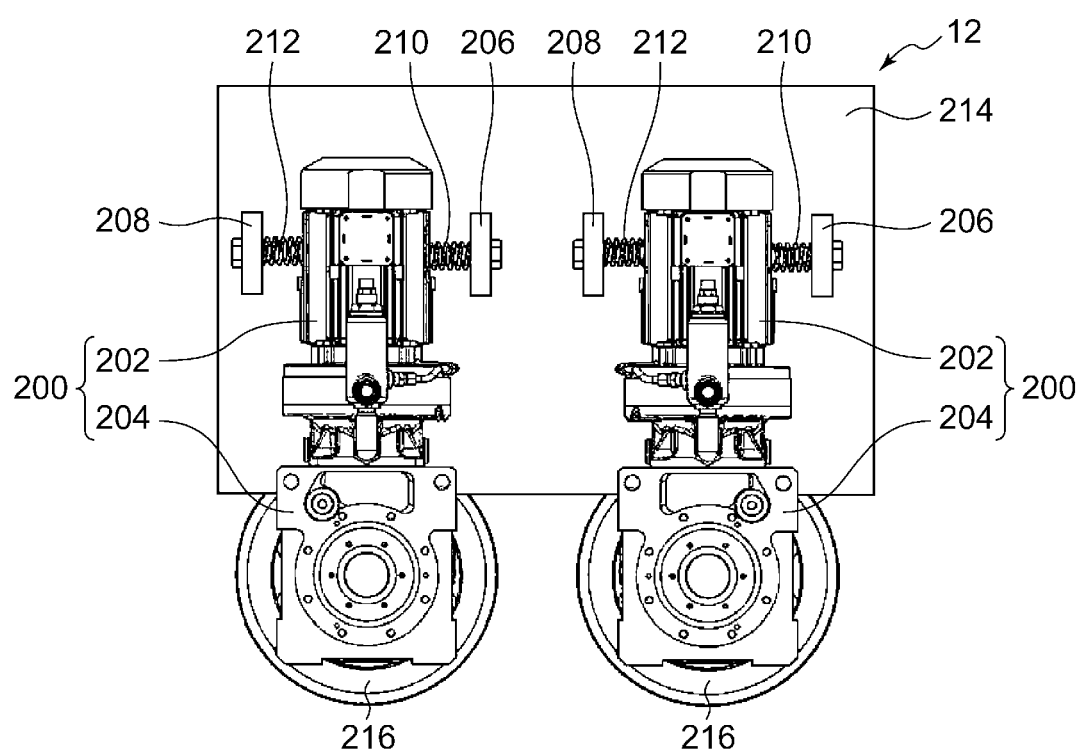
FIG. 5 is a lateral view of the traveling mechanism of FIG. 4.

FIG. 4 is a perspective view of a traveling mechanism 12 provided with a gear motor 200 according to the second embodiment. FIG. 5 is a lateral view of the traveling mechanism 12. In this example, the traveling mechanism 12 is embodied by the wheels of a guided transfer crane and the surrounding parts. The traveling mechanism 12 comprises a frame 214, which is a part of the body of the transfer crane, and two traveling parts arranged in the horizontal direction. The two traveling parts are basically identically configured so that the following description highlights one of the traveling parts.

The traveling part includes a wheel 216 compatible with rails (not shown) laid on the ground, a gear motor 200 for driving the wheel 216 into rotation, a first antirotation member, and a second antirotation member. The gear motor 200 is attached to the shaft of the wheel 216 so as to rotate the wheel 216. The gear motor 200 includes a motor 202 and a decelerator 204. The motor 202 and the decelerator 204 correspond to the motor 102 and the decelerator 104 according to the first embodiment, respectively. The output shaft of the decelerator 204 is mechanically coupled to the shaft of the wheel 216.

The first and second antirotation members prevent the gear motor 200 from being rotated around the shaft of the wheel 216. Each of the first and second antirotation members is located at a position offset from the center of the output shaft of the decelerator 204 at which it is possible to prevent rotation of the gear motor 200.

The first antirotation member includes a first antirotation plate 206 and a first spring 210. The second antirotation member includes a second antirotation plate 208 and a second spring 212. The first and second antirotation plates 206 and 208 are disposed to stand on the frame 214 so as to sandwich the motor 202 between the plates. The first spring 210 is attached to the surface of the first antirotation plate 206 facing the motor 202. In other words, the first spring 210 is sandwiched by the motor 202 and the first antirotation plate 206. The second spring 212 is attached to the surface of the second antirotation plate 208 facing the motor 202.

The first spring 210 is positioned to extend and contract in accordance with the distance between the motor 202 and the first antirotation plate 206. In particular, one end of the first spring 210 is attached to the first antirotation plate 206 and the other end faces the motor 202. Referring to FIG. 5, when the gear motor 200 itself is rotated clockwise, the motor 202 approaches the first antirotation plate 206. This causes the first spring 210 to contract until the rotation torque balances the torque from the reaction of the first spring 210. A similar situation holds true of the second spring 212.

A description will now be given of the operation of the gear motor 200 configured as described above. To start the traveling mechanism 12, the operator powers the motor 202 on. This applies a voltage of the same level as used in a normal operation to the motor 202. In this process, a shock load of a considerable amount is exerted on the gear motor 200 due to the inertia of the gear inside the decelerator 204 or of the wheel 216. The first and second antirotation members support the gear motor 200 on the frame 214 so as not to cause the gear motor 200 to be rotated due to the shock load. In this process, the first spring 210 or the second spring 212 absorbs the shock load. More specifically, the gear motor 200 is permitted to be rotated slightly around the shaft of the wheel 216 as a result of the first spring 210 or the second spring 212 extending or contracting. This scatters the shock generated when the motor 202 is started. The shock load is similarly absorbed when the traveling mechanism 12 is stopped.

The gear motor 200 according to the embodiment provides an advantage similar to the advantage provided by the gear motor 100 according to the first embodiment.

Described above is the configuration and operation of the gear motor according to the embodiments. The embodiment is intended to be illustrative only and it will be obvious to those skilled in the art that various modifications to constituting elements could be developed and that such modifications are also within the scope of the present invention.

In the first and second embodiments, the output shaft of the decelerator is described as being a hollow shaft. Alternatively, the output shaft may be a solid shaft.

In the second embodiment, two antirotation members are provided by way of example. Alternatively, one antirotation member may be provided if the gear motor is assumed to be rotated in one direction.

In the first and second embodiments, the motor is described as not being controlled by an inverter. Alternatively, the motor may be controlled by an inverter.

The antirotation member according to the second embodiment is described as including an antirotation plate and a spring. Alternatively, an alternative elastic member (e.g., rubber) may be used in place of the spring.

In the first and second embodiments, the decelerator is described as providing perpendicular deceleration. Alternatively, the decelerator may be a parallel shaft decelerator.

Priority is claimed to Japanese Patent Application No. 2012-285149, filed Dec. 27, 2012, the entire content of which is incorporated herein by reference.

What is claimed is:

1. A gear motor comprising:
    a motor;
    a decelerator;
    an output shaft of the decelerator coupled to a driven shaft of a driven machine; and
    an antirotation member for preventing rotation of the gear motor around the driven shaft,
    wherein the antirotation member is located at a position offset from the center of the output shaft of the decelerator at which it is possible to limit rotation of the gear motor, and the antirotation member includes a first elastic member on a side facing the gear motor,
    wherein the decelerator is configured to provide perpendicular deceleration,
    wherein the first elastic member faces the motor,
    wherein the antirotation member includes a first antirotation plate disposed on the rotational trajectory of the motor around the driven shaft, and the first elastic member is sandwiched between the first antirotation plate and the motor.

2. The gear motor according to claim 1, wherein the output shaft of the decelerator is a hollow shaft, and the driven shaft is inserted into the output shaft.

3. The gear motor according to claim 1, wherein the motor is not controlled by an inverter.

4. The gear motor according to claim 1, wherein the elastic member is a spring.

5. The gear motor according to claim 1, wherein the antirotation member includes a second elastic member sandwiched between a second antirotation plate and the motor.

* * * * *